April 25, 1950
A. J. HOUSMAN
2,505,185
POWER SUPPLY SYSTEM
Filed Jan. 7, 1948
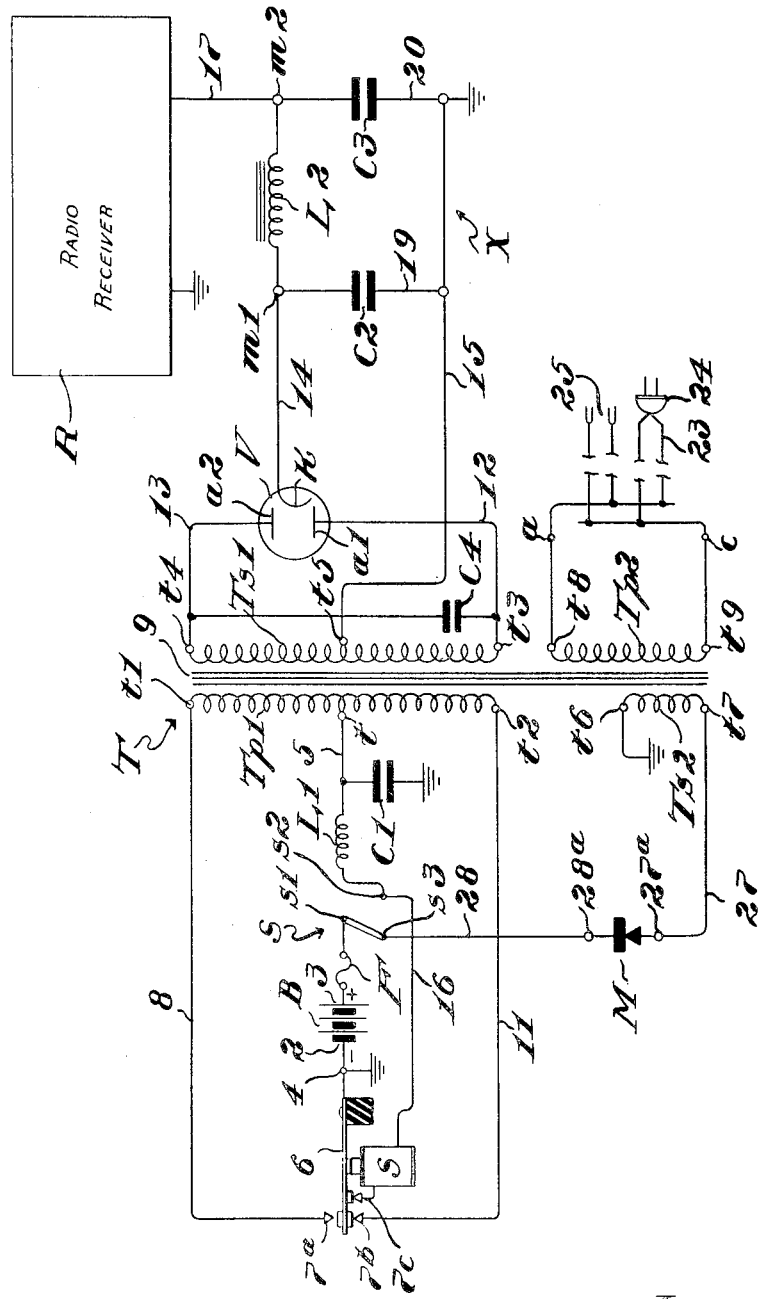
Inventor
Abraham J. Housman
by Roberts, Cushman & Grover
Atty's Patented Apr. 25, 1950

2,505,185

UNITED STATES PATENT OFFICE 2,505,185

POWER SUPPLY SYSTEM

Abraham J. Housman, Jamaica Plain, Mass.

Application January 7, 1948, Serial No. 931

1 Claim. (Cl. 171—97)

Radio receiving apparatus installed in an automobile imposes a severe strain upon the electrical system, particularly when the electrical load is further increased by heavy currents drawn by starter motor, head lamps and motors in the heater and defrosting devices. Particularly if radio and starter are frequently used the generator is unable to maintain the storage battery charged, and under such operating conditions the battery can be periodically recharged from an auxiliary charger when the automobile is not in use. The use of auxiliary chargers however often involves certain inconveniences and is moreover limited to the garage or other place where the charger is installed.

Because of the inconvenience of these expedients battery maintenance often is neglected and a discharged battery restored by a quick charging method despite the danger of battery plate buckling and shortening of battery life.

The main object of this invention is to provide a device suitable for installation in an automobile which will maintain the full charge of the automobile battery under severe operating conditions, which is simple and convenient to use, and which is safe and economical in operation. Another object is to provide a self-contained battery charger for a radio set in order to permit charging the battery during periods of excessive drain or for the purpose of general battery charging and boosting such as may be desirable during prolonged periods of non-use or during the winter months.

In a broad aspect the invention contemplates a power supply system including a low voltage storage battery to be charged from an alternating current source supplied through an appliance requiring for its operation a direct voltage higher than the battery voltage. The power supply system includes a transformer, with a core wound with two primary and two secondary windings, connected to the appliance. One of the primary windings is an element in a feeding network which is connected to the alternating current source and the other primary winding is connected to the battery. The battery is also connected to one of the secondary windings, through a rectifier in the feeding network. The other secondary winding is connected to the appliance.

In a more specific aspect the invention contemplates an automobile radio system with a low voltage auto type battery adapted to be attached to an alternating current supply by a transformer and a barrier layer, such as a copper oxide rectifier. The system further includes a conventional radio receiver operated by direct current from a rectifier, for example a rectifier tube connected to the secondary winding of the transformer which is an element in a voltage step up network that also includes a vibrator connected between the primary of this transformer and the battery. In a further aspect of the invention, the four above-mentioned transformer windings are applied to one and the same core thus constituting a unitary structure.

For the purpose of illustrating these and other objects, aspects and features, a typical embodiment of the invention will be described with reference to a drawing the single figure of which is a circuit diagram of this embodiment of my power supply system.

The electrical system now to be described by way of example comprises two networks connected to a battery. One of the networks steps up the low direct voltage from a storage battery B of the type used in automobiles to a higher direct voltage required by an appliance such as an automobile radio R. The negative pole 2 of the battery B is linked to the grounded terminal 4 of an inverter such as an elastic vibrator contact element 6 which oscillates between the vibrator points 7a, 7b and 7c. One of the vibrator points 7a is joined by a wire 8 to one end $t1$ of a primary winding $Tp1$ upon a core 9 of a transformer T. Another of the vibrator points 7b is connected to the opposite end $t2$ of the winding $Tp1$ by a wire 11. The vibrator element 6 is actuated in well known manner by a solenoid S which is connected between the vibrator point 7c, and a positive pole 3 of the battery B by a wire 16, a stationary contact $s2$ and a moving contact $s1$ of a switch $s$ and a fuse F. A midtap $t$ of the winding $Tp1$ is also connected to the positive pole 3 through the fuse F, the switch $s$, choke coil L1 and a lead 5.

The coil L1 and a capacitor C1, connected from the terminal $t$ to ground, comprise a filter tuned to eliminate radio frequency interference which otherwise would be picked up by the radio R.

Magnetically linked with the primary winding $Tp1$ is a secondary winding $Ts1$. Across the terminals $t3$ and $t4$ of the winding $Ts1$ is connected a buffer capacitor C4. The terminals $t3$ and $t4$ are also connected to the anodes $a1$ and $a2$ of a rectifying tube V, by wires 12 and 13 respectively. The middle tap $t5$ of the winding $Ts1$ is grounded through a wire 15. The cathode $k$ of the tube V is connected by a wire 14 to a terminal $m1$ of a choke L2 of a condenser input filter circuit X for the radio R. The filter X has the two capacitors C2 and C3 in addition to the choke L2. One plate of each of the capacitors C2 and C3 is joined to the grounded wire 15 by leads 19 and 20 respectively. The other plate of capacitor C2 is connected to the choke terminal $m1$. The second plate of the capacitor C3 is connected to a terminal $m2$ at the opposite end of the choke L2. The filter circuit is joined to the radio R by a lead 17 which is connected to terminal $m2$.

A second feeding network charges the battery B by reducing and rectifying the voltage from a standard alternating current power source such as the conventional power supply to a house or garage. This network comprises a copper oxide rectifier M, a secondary winding $Ts2$ and a primary winding Tp2 wound on the core 9 of the transformer T. The terminals t8 and t9 at the ends of the primary winding Tp2 are connected to input terminals a and c which can be connected to an alternating power source (not shown) by the leads 23 and a male plug 24. A power take off such as a female plug 25 is connected in parallel across the terminals a and c, so that power can be taken from the winding Tp2 under certain conditions as will be described hereinafter.

The terminal t6 at one end of the secondary winding Ts2 is grounded whereas terminal t7 at the opposite end of the winding Tp2 is connected with one terminal 27a of the rectifier M by a wire 27. The other terminal 28a of the rectifier M is joined to a stationary contact s3 of the switch s by wire 28. The terminals 27a and 28a are arranged so that the rectifier M can be removed and reinserted with reversed polarity to accommodate an automobile wherein the positive pole 3 of the battery B is grounded.

The radio is operated by manually closing the contacts s1 and s2 of the switch s to energize the solenoid S from the battery B through an inverter network including the positive pole 3, the fuse F, the switch contacts s1 and s2, the wire 16, the winding of the solenoid S, the vibrator element contacts 7c and 6, the vibrator terminal 4 and the battery pole 2. As well known, the magnetic flux resulting from the energization of the solenoid S deforms the vibrator element 6 so that it contacts the point 7b to short circuit the solenoid and to impress an electrical pulse from the battery B through the portion of the transformer winding Tp1 between the terminals t and t2. The deenergization of the solenoid S collapses the magnetic field to release the vibrator element 6 so that it springs upwardly to contact the point 7a and send an electrical impulse through the portion of the transformer winding Tp1 between the terminals t1 and t. The movement of the vibrator element 6 then breaks the connection with the point 7b and removes the short circuit across the solenoid S so that the vibrator element 6 is again attracted by the magnetic field of the solenoid to contact the point 7b and repeat the cycle.

The electrical pulses send alternately through the adjacent portions the winding Tp1 by the vibrator element 6 set up pulsating magnetic fields in the core 9 of the transformer T. The magnetic fields link with and induce electromotive forces in the winding Ts1. Depending upon the polarity of the induced electromotive force an electrical current circulates either through a circuit comprising the portion of the winding Ts1 between the terminals t4 and t5, the wire 13, the anode a2, the cathode k, the wire 14, the filter circuit X and the wire 15; or a circuit comprising the portion of the winding Ts1 between the terminals t3 and t5, the wire 12, the anode a1, the cathode k, the filter circuit X, and the wire 15. In either case a pulsating direct current appears across the wires 14 and 15 in response to each movement of the vibrator element 6. This pulsating current is introduced into the filter circuit X where the choke L2 and the capacitors C2 and C3 smooth out the resulting ripple so that the radio R receives through the leads 16 and 17 an approximately continuous current.

The pulsating magnetic fields in the transformer core 9 also link with and induce an electromotive force in the winding Tp2, which appears across the terminals a and c. The plug 25 is provided as a convenient method of connecting and using this potential to operate in the automobile, a lower power alternating current device such as an electric shaver or a small fluorescent lamp.

The charge taken from the battery by the radio R or other electrical apparatus is replenished by means of the feeding network when the automobile is in the garage so that the battery is charged and available for starting the motor. The plug 24 is connected to an alternating current power source such as the conventional household power supply. The voltage impressed across the terminals a and c from the power source applies alternating current to winding Tp2 which magnetizes the core 9 of the transformer T and induces a potential difference between the terminals t6 and t7. During the portion of the alternating current cycle when the tap t7 is positive with respect to the terminal t6, unidirectional current flows through winding Ts2, wire 27, rectifier M, contacts s3 and s1 of the switch s, fuse F, and battery B to ground at the terminal 4, charging battery B. During the negative portion of the cycle current flow tending to discharge battery B is barred by the unidirectional characteristics of rectifier M.

It will be noted that the above described circuit requires only a single transformer core and therefore, in addition to other advantages, considerably reduces the bulk, weight and cost of devices of this type.

It should be understood that the present disclosure is for the purpose of illustration only and that this invention includes all modifications and equivalents which fall within the scope of the appended claim.

I claim:

In an automobile radio system capable of being charged from a conventional alternating current supply, a low voltage automobile type storage battery, a transformer having a core with two secondary windings and two primary windings mounted thereupon, one of said primary windings having a center tap, one of said secondary windings being connected to said radio, a single pole double throw switch, one position of which connects one pole of said battery to said center tap, an inverter including a vibrator unit for alternately connecting the ends of said tapped primary winding to the other pole of said battery thereby to supply power to said radio from said battery, terminals for connecting the other primary winding to said alternating power supply, and a half wave rectifier connected in series with the second secondary winding thereby to charge said battery when the terminals of said primary winding are are connected to the alternating current supply.

ABRAHAM J. HOUSMAN.

REFERENCES CITED

The following references are of record in the file of this patent:

UNITED STATES PATENTS

| Number | Name | Date |
|---|---|---|
| Re. 18,971 | Rockwell | Oct. 24, 1933 |
| 1,627,815 | Weibler | May 10, 1927 |
| 2,008,413 | Dawson | July 16, 1935 |
| 2,060,025 | Durt et al. | Nov. 10, 1936 |
| 2,140,094 | Sullivan | Dec. 13, 1938 |
| 2,240,123 | Shoup et al. | Apr. 29, 1941 |
| 2,423,646 | Flippen et al. | July 8, 1947 |